United States Patent
Rhodes et al.

(10) Patent No.: US 10,716,256 B2
(45) Date of Patent: Jul. 21, 2020

(54) SENSOR SYSTEM FOR DETERMINING CROP YIELD

(71) Applicant: Deere & Company, Moline, IL (US)

(72) Inventors: Michael L. Rhodes, Richfield, NM (US); Kevin P. Cowles, Fargo, ND (US); Noel W. Anderson, Fargo, ND (US); Gurmukh H. Advani, West Fargo, ND (US)

(73) Assignee: DEERE & COMPANY, Moline, IL (US)

( * ) Notice: Subject to any disclaimer, the term of this patent is extended or adjusted under 35 U.S.C. 154(b) by 261 days.

(21) Appl. No.: 15/967,589

(22) Filed: Apr. 30, 2018

(65) Prior Publication Data

US 2019/0082594 A1    Mar. 21, 2019

Related U.S. Application Data

(60) Provisional application No. 62/559,445, filed on Sep. 15, 2017.

(51) Int. Cl.
*A01D 41/127* (2006.01)
*G01F 1/80* (2006.01)
(Continued)

(52) U.S. Cl.
CPC ..... *A01D 41/1271* (2013.01); *A01D 41/1272* (2013.01); *A01D 61/00* (2013.01);
(Continued)

(58) Field of Classification Search
CPC ............ A01D 41/1271; A01D 41/1272; A01D 43/085; A01D 61/00; A01D 75/28;
(Continued)

(56) References Cited

U.S. PATENT DOCUMENTS

| 5,343,761 A | 9/1994 | Myers |
| 5,959,218 A * | 9/1999 | Strubbe .............. A01D 41/1271 73/861.71 |

(Continued)

FOREIGN PATENT DOCUMENTS

| DE | 1802213 A1 | 5/1970 |
| EP | 0208025 A1 | 1/1987 |

(Continued)

OTHER PUBLICATIONS

Search Report issued in counterpart application No. EP18188592.2, dated Dec. 21, 2018 (7 pages).

(Continued)

*Primary Examiner* — Robert E Pezzuto (57) ABSTRACT

A sensor system for determining crop yield. The sensor system comprises a mounting structure mounted to a housing of a grain elevator of an agricultural work machine and has at least one aperture formed therein. A fulcrum assembly is arranged on the mounting structure. A rocker arm is pivotal about a pivot axis of the fulcrum assembly and extends between a first end and a second end. An engagement member is coupled to the second end of the rocker arm and extends through the at least one aperture of the mounting structure. At least one gap distance sensor is mounted to the fulcrum assembly and is configured to detect an inclination of the rocker arm relative to the fulcrum assembly. A processing device is coupled to the gap distance sensor and is configured to correlate the detected inclination of the rocker arm to an applied force.

20 Claims, 11 Drawing Sheets

(51) Int. Cl.
*A01D 61/00* (2006.01)
*G01G 19/12* (2006.01)
*G01G 11/04* (2006.01)

(52) U.S. Cl.
CPC ............... *G01F 1/80* (2013.01); *G01G 11/04* (2013.01); *G01G 19/12* (2013.01)

(58) Field of Classification Search
CPC . A01F 12/46; G01F 1/206; G01F 1/30; G01F 1/80; G01F 1/663; G01F 1/76; G01F 1/20
USPC ............. 56/10.2 C, 10.2 R, 14.6; 73/861.71, 73/861.73, 861.74; 222/71; 460/1, 4–6
See application file for complete search history.

(56) References Cited

U.S. PATENT DOCUMENTS

| | | | | |
|---|---|---|---|---|
| 5,970,802 | A * | 10/1999 | Strubbe | G01F 1/76 73/861.71 |
| 6,138,518 | A * | 10/2000 | Strubbe | G01F 1/206 73/861.73 |
| 6,820,459 | B2 | 11/2004 | Beck et al. | |
| 6,899,616 | B1 * | 5/2005 | Murray | A01D 75/28 460/6 |
| 7,430,845 | B2 * | 10/2008 | Kormann | A01D 43/085 460/1 |
| 9,506,786 | B2 | 11/2016 | Strnad et al. | |
| 9,686,914 | B2 * | 6/2017 | Koch | G01F 3/00 |
| 2018/0084720 | A1 | 3/2018 | Brandmeier et al. | |
| 2018/0087939 | A1 | 3/2018 | Brandmeier et al. | |
| 2019/0082595 | A1 | 3/2019 | Advani et al. | |

FOREIGN PATENT DOCUMENTS

| | | |
|---|---|---|
| EP | 0853234 A1 | 7/1998 |
| EP | 0877234 A2 | 11/1998 |
| EP | 1169905 A2 | 1/2002 |
| WO | 2013023142 A1 | 2/2013 |
| WO | 2014210073 A1 | 12/2014 |

OTHER PUBLICATIONS

Search Report issued in related application No. EP18191540.6, dated Dec. 21, 2018 (7 pages).

Park, J. W. "Piezoelectric Bedload Impact Sensor (PBIS) for Particle Size Distribution." Doctoral dissertation, University of Louisville [online], Dec. 2013 [retrieved on Feb. 6, 2017]. Retrieved from the Internet<http://ir.library.louisville.edu/cgi/viewcontent.cgi?article=2094&context=etd>.

* cited by examiner

FIG. 9

SENSOR SYSTEM FOR DETERMINING CROP YIELD

FIELD OF THE DISCLOSURE

The present disclosure relates generally to a sensor system having a balance beam force sensor for determining crop yield.

BACKGROUND OF THE DISCLOSURE

During harvesting, the real-time monitoring and determination of crop yields is often desirable to improve harvesting operations and to provide pertinent information (e.g., crop performance) about the crop being harvested. For example, such information can be used to determine high and low performance areas, as well as for comparison purposes to compare the yield of a variety of seed types. The yield monitor for grain measures and records information such as grain flow, grain moisture, area covered, and location. Based on the measured yield, other properties may be determined such as moisture and grain flow.

Some conventional approaches have employed the use of translational (i.e., non-rotational and linear translation) sensor devices for measuring yields. Translational sensor devices, however, pose significant disadvantages such as decreased sensor resolution, increased measurement errors, and limited sensing ranges, thereby resulting in imprecise yield measurements that can be costly. Other conventional approaches have employed fill level sensors that determines mass flow based on a measured change in a dielectric constant of a parallel plate capacitor. Drawbacks to such conventional approaches include low sensor resolution and decreased sensing accuracy. As such, there is a need in the art for an improved sensor system that overcomes the limitations of the conventional approaches.

SUMMARY OF THE DISCLOSURE

According to an aspect of the present disclosure, a sensor system for determining crop yield. The sensor system comprises a mounting structure mounted to a housing of a grain elevator of an agricultural work machine proximate a crop conveyor assembly arranged in the housing.

The mounting structure comprises at least one aperture formed therein. A fulcrum assembly is arranged on the mounting structure and comprises a fulcrum element coupled to a base member. A rocker arm is pivotal about a pivot axis of the fulcrum assembly and is arranged to extend between a first end and a second end. An engagement member is coupled to the second end of the rocker arm and is arranged to extend through the at least one aperture of the mounting structure.

At least one gap distance sensor device is mounted to the base member of the fulcrum assembly and is configured to detect an inclination of the rocker arm relative to the fulcrum assembly. A processing device is coupled to the gap distance sensor and is configured to correlate the detected inclination of the rocker arm to an applied force acting on the engagement member when a movable grain mass engages with the engagement member. The processing device is also configured to determine an aggregate crop yield based on the applied force.

Other features and aspects will become apparent by consideration of the detailed description and accompanying drawings.

BRIEF DESCRIPTION OF THE DRAWINGS

The detailed description of the drawings refers to the accompanying figures in which.

DETAILED DESCRIPTION OF THE DRAWINGS

Figure 7:
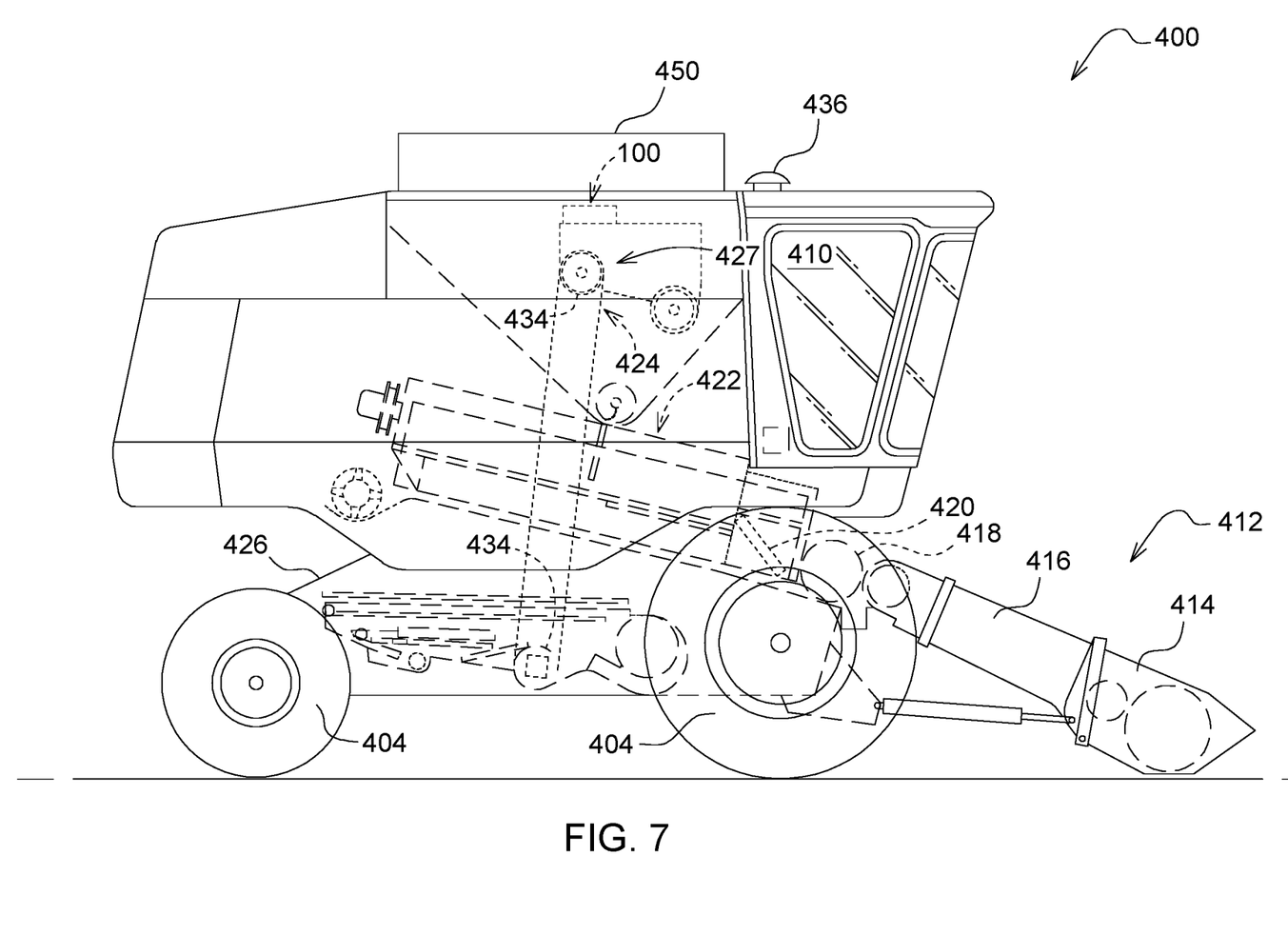
FIG. 7 is a side view of an agricultural work machine including an embodiment of the sensor system of FIG. 1.
Figure 8:
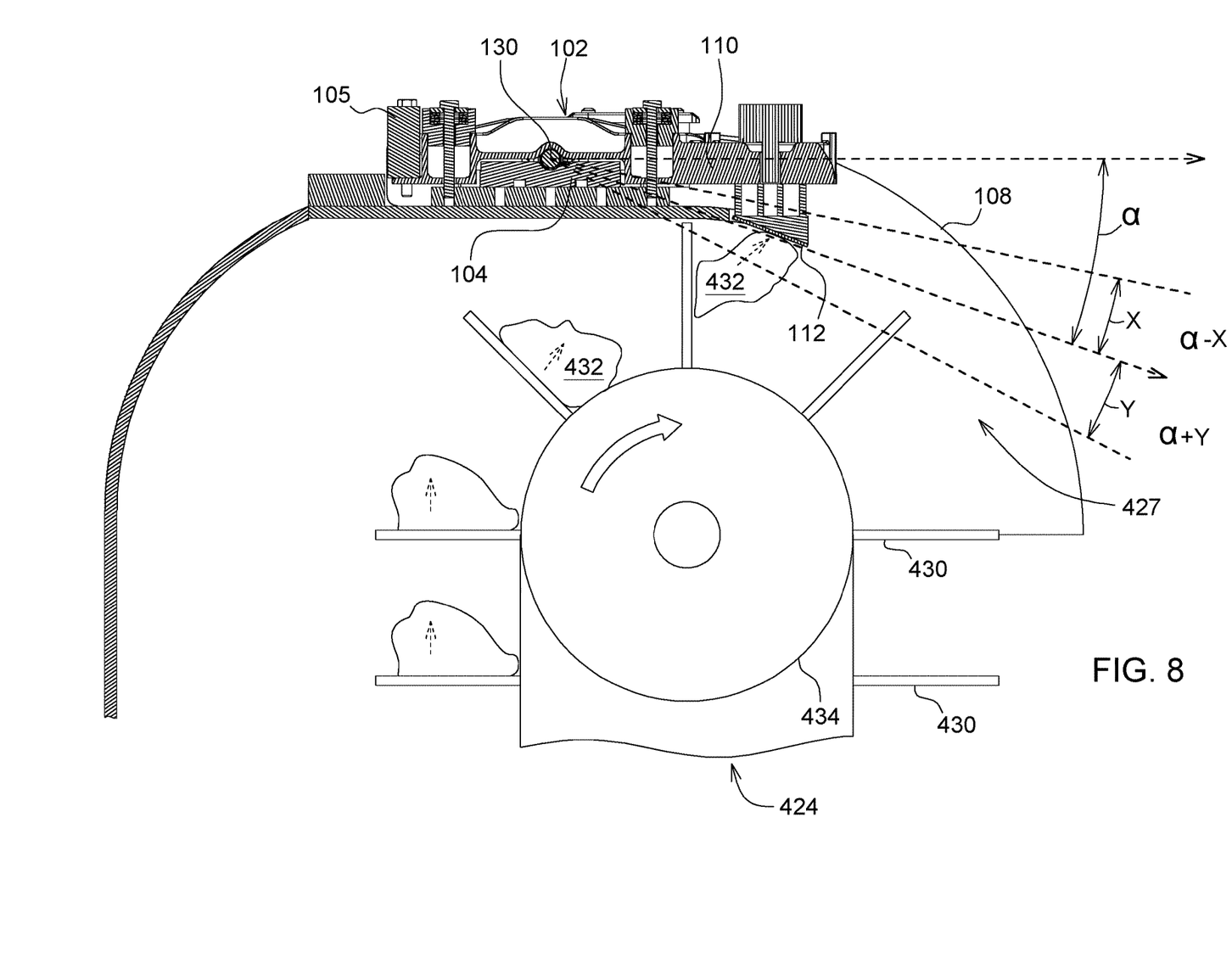
FIG. 8 is side view of the material engagement member of FIG. 1 arranged proximate a crop conveyor assembly arranged in the agricultural work machine of FIG. 7 according to an embodiment.

Referring to FIGS. 1-4, a sensor system 100 for determining crop yield is shown according to an embodiment. The sensor system 100 can comprise a material engagement member 102, a fulcrum assembly 104, and at least one gap distance sensor 106 collectively arranged on a mounting structure 108 coupled arranged proximate a crop conveyor assembly 424 located in an agricultural work machine 400 (FIGS. 7 and 8). For purposes of clarity, the present disclosure will be described as being implemented in an agricultural work machine including a harvester, however, it should be noted that the present disclosure may also be employed in other yield monitoring applications such as seeding.

In some embodiments, the mounting structure 108 is mounted proximate a rotating mechanism 434 arranged in the crop conveyor assembly 424 and can comprise at least one aperture 118 that is sized and dimensioned relative to a length of the material engagement member 102. For example, the positioning and structural geometry of the aperture 118 can and will vary based on the size and shape of at least one member of the material engagement member 102 (refer, e.g., to FIG. 4). The mounting structure 108 can comprise a mounting plate 120 having at least two side walls 122 extending in a direction substantially parallel to an upper planar surface 126 of the mounting plate 120. A plurality of mounting holes 127 can be spatially arranged on the upper planar surface 126 for receiving fasteners to secure placement of the fulcrum assembly 104 or other components to the mounting plate 120 in a variety positions. A rear panel 128 can be arranged to project upwardly and away from the mounting plate 120 rearward of the material engagement member 102.

Figure 5A:
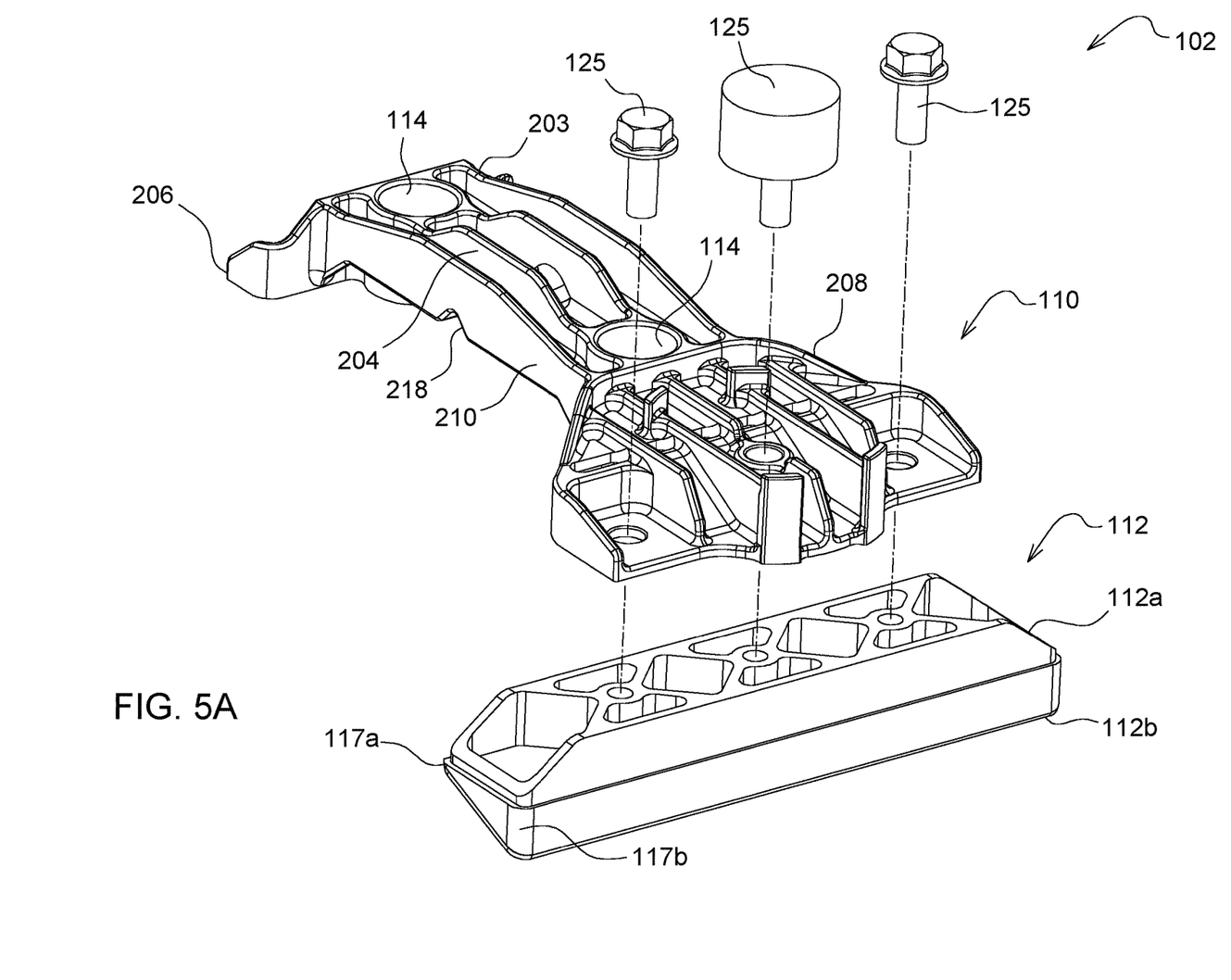
FIG. 5A is an expanded perspective view of a material engagement member arranged in the sensor system of FIG. 1 according to an embodiment.
Figure 5B:
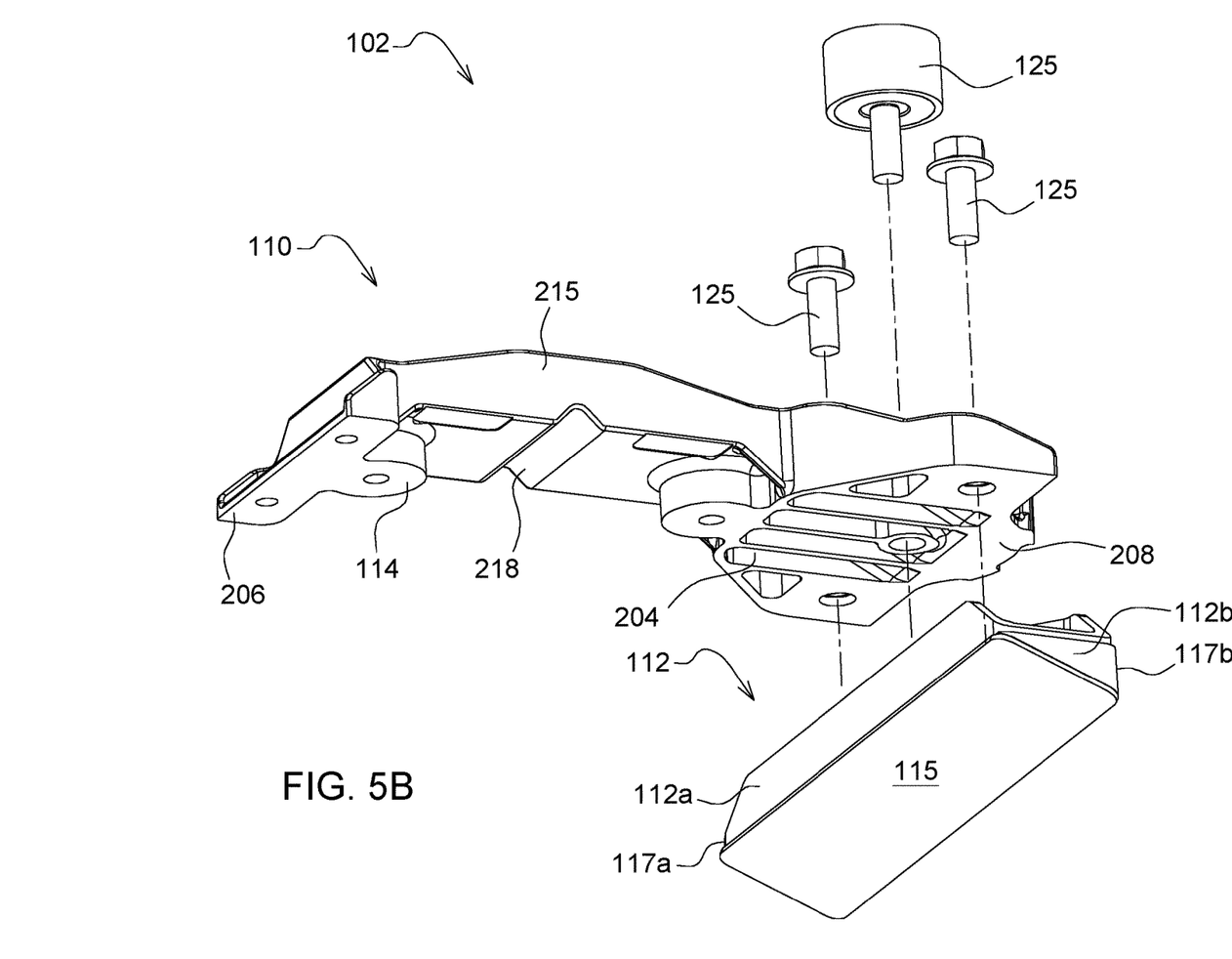
FIG. 5B is an expanded side view of the material engagement member of FIG. 5A according to an embodiment.
Figure 5C:
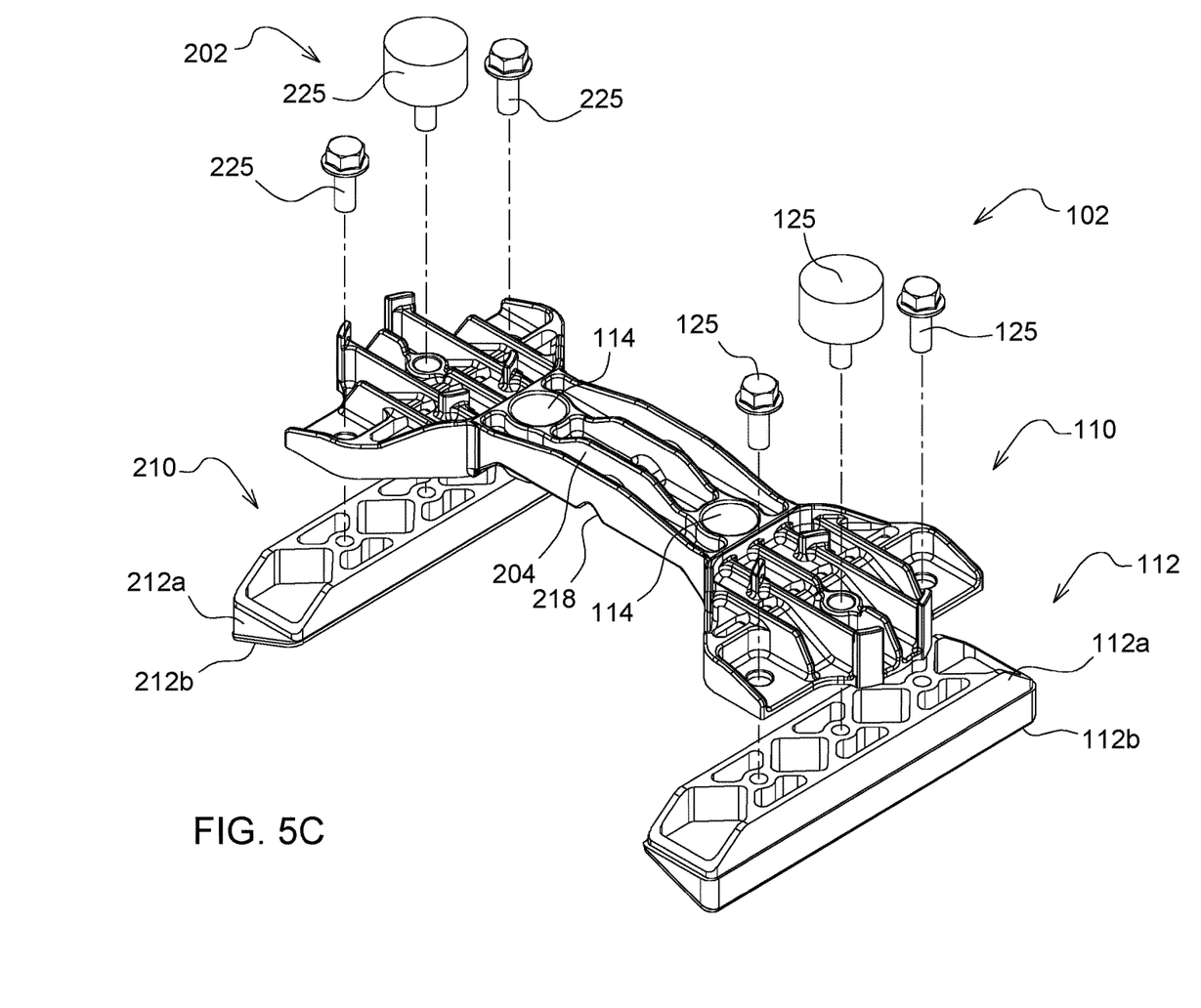
FIG. 5C is an expanded side view of a material engagement member arranged in the sensor system of FIG. 1 according to an embodiment.

The material engagement member 102 (e.g., a rocker arm) is coupled to the mounting structure 108 and can be arranged to extend between a first end and a second end. In some embodiments, the material engagement member 102 can comprise a rocker arm 110 (i.e., rocker arm fixedly or removably to an engagement member 112. The rocker arm 110 can comprise a beam or cantilever-like structure that is coupled in flushed relation to the engagement member 112 at either or both of the first and second ends 111, 113 (FIGS. 5A, 5B, 5C). A counterweight 105 can be arranged at least one of the first or second ends 111, 113 of the material engagement member 102 for balancing a weight distribution of the material engagement member 102 in either a first position or a second position.

At least one cylindrical groove 114 can be defined within the rocker arm 110 and is adapted to receive an elastic member 116 such as an elongate spring (e.g., a coil spring, torsional spring, Belleville washer, etc.) having a restoring force. The elastic member 116 is arranged to bias the material engagement member 102 in a given direction and to apply a restoring force to pivot the material engagement member 102 to a return position (i.e., null position) when the material engagement member 102 is pivotally displaced from the mounting structure 108. For example, the rocker arm 110 can be arranged to extend above the fulcrum assembly 104 and is pivotal with respect to the mounting structure 108 about a fulcrum element 130 of the fulcrum assembly 104. A shaft receiving channel 118 (FIG. 5B) can be formed in or on a pivot surface of the rocker arm 110 and is adapted to engage a complementary surface of the fulcrum element 130.

Figure 3:
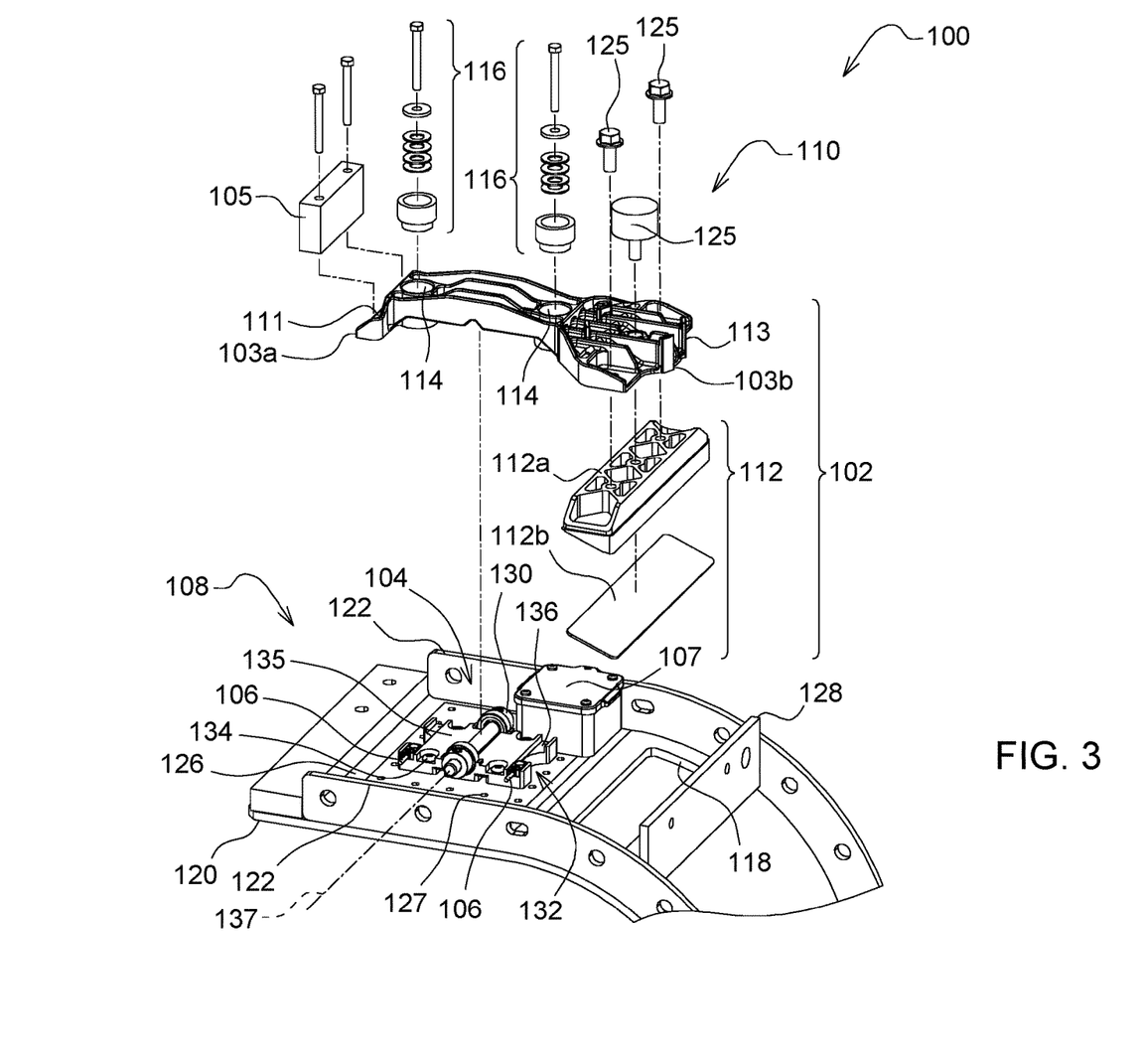
FIG. 3 is an expanded view of a sensor system for determining crop yield according to an embodiment.
Figure 4:
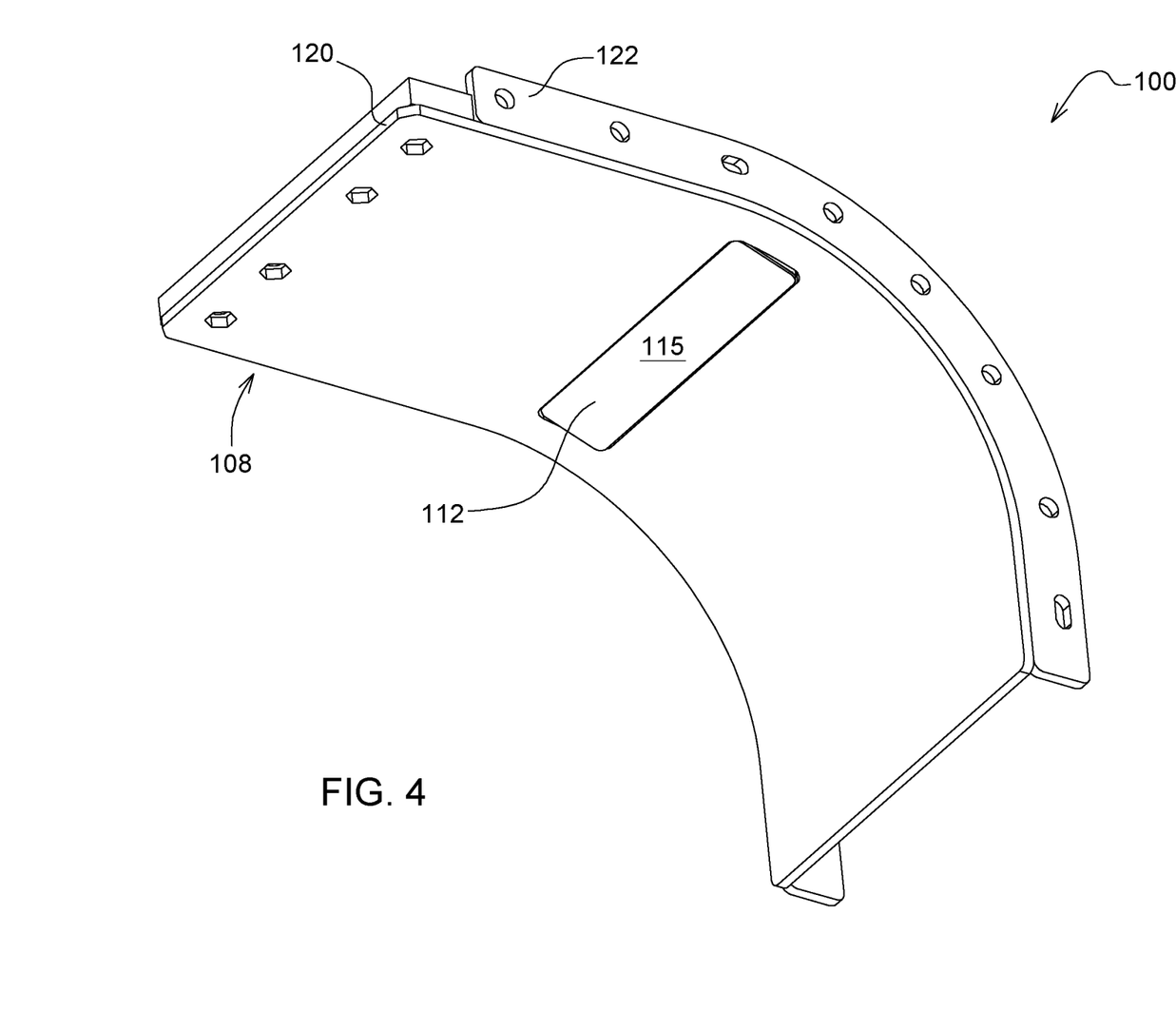
FIG. 4 is a bottom view of the sensor system of FIG. 1 according to an embodiment.

As shown in FIG. 3, in embodiments, the fulcrum assembly 104 can comprise the fulcrum element 130 attached to a base assembly 132. The fulcrum element 130 can comprise a rotating shaft or similar structure that is arranged to pivot about a pivot axis 137 without translation, with the pivot axis 137 being arranged substantially parallel to a planar surface of the base assembly 132. The base assembly 132 can comprise a support substrate 135 comprising one or more mounting apertures arranged to receive fastener elements 134 (e.g., bolts or screws) to permit mounting of the base assembly 132 to the mounting structure 108. At least one sensor cavity 136 can be arranged on an outer portion of the base assembly 132 to secure placement and positioning of one or more of the gap distance sensors 106.

Although in embodiments herein, the at least one gap distance sensor 110 will be shown positioned in the one or more sensor cavities 136 arranged on the base assembly 132, in other embodiments, it is also possible for sensor 110 to be arranged on the mounting structure 108 or other support structures. Additionally, as shown in FIG. 3, the at least one gap distance sensor 106 can comprise a first sensor element 106a and a second sensor element 106b arranged opposing sides of the fulcrum element 130.

Figures 1A, 1B:
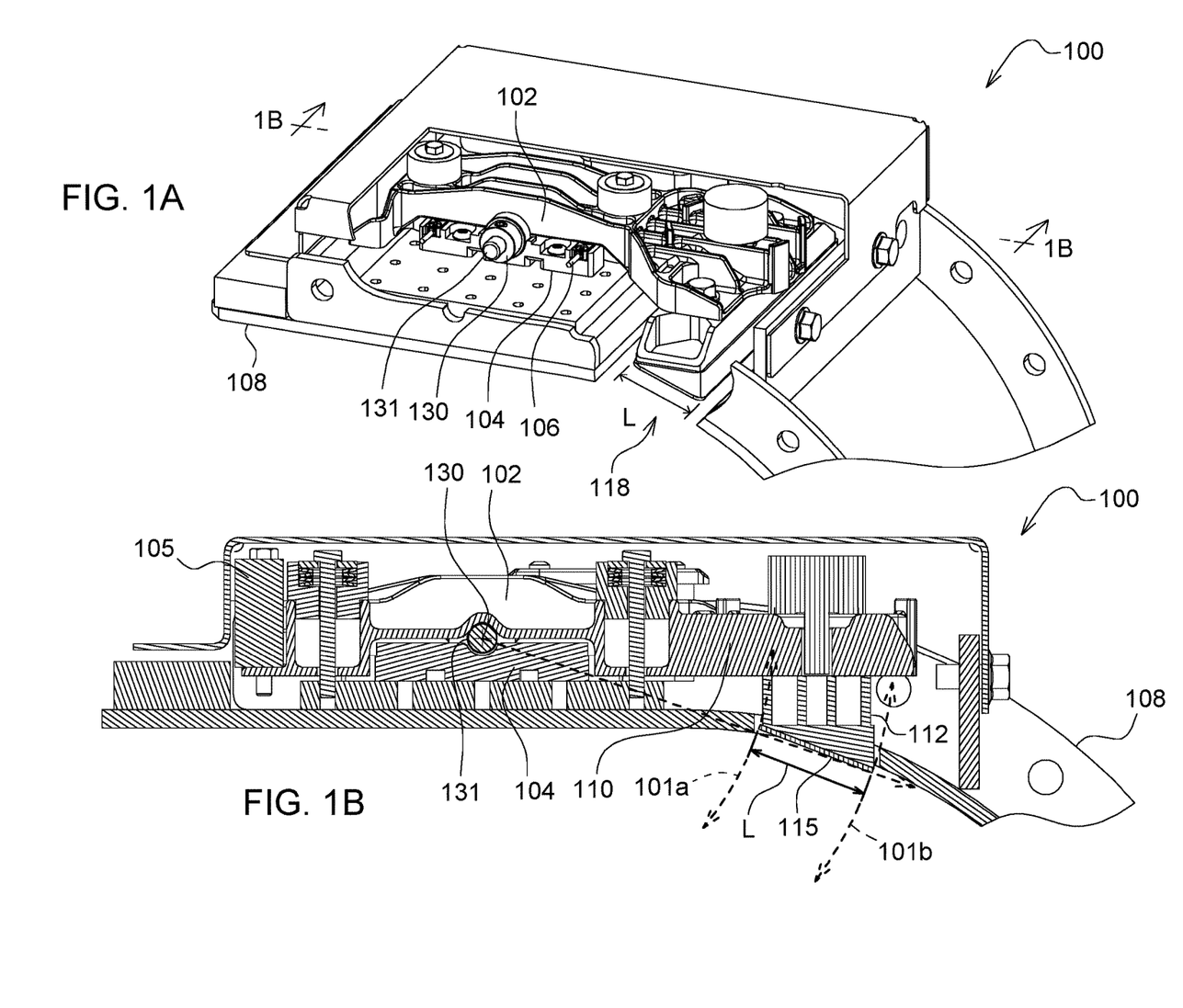
FIG. 1A is a perspective side view of the sensor system of FIG. 1 according to an embodiment.
FIG. 1B is a cross-sectional side view of the sensor system of FIG. 1 according to an embodiment.
Figure 2:
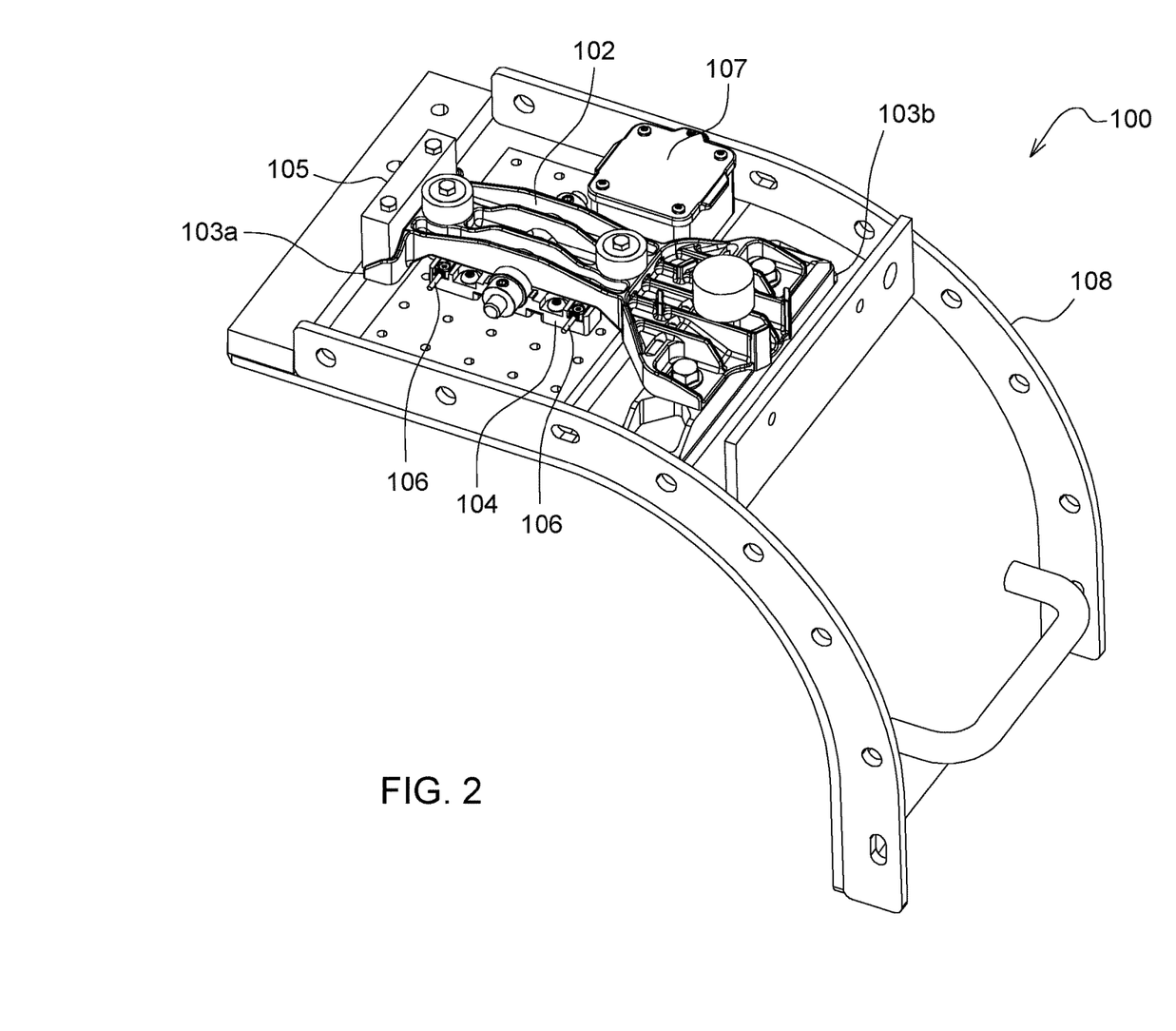
FIG. 2 is a top perspective view of the sensor system of FIG. 1 according to an embodiment.

As arranged, the at least one gap distance sensor 106 is configured to detect an inclination of the material engagement member 102 (relative to the fulcrum assembly 104 (i.e., pivot point) and is communicatively coupled to a processing device 107. The processing device 107 can comprise a microprocessor, a microcontroller, a digital signal processor, a programmable logic controller, or other suitable computing devices and can be arranged locally on the agricultural work machine as shown or remotely at a remote processing facility. In various embodiments, and as will be discussed with reference to FIG. 9, the at least one gap distance sensor 106 can comprise a variety of sensors including, but not limited to, potentiometers, encoders, magneto-resistive sensors, magnetic proximity sensors, optical sensors, acoustic sensors, Hall-effect sensors, inductive sensors, or combinations thereof As will be appreciated by those skilled in the art, FIG. 1 is provided merely for illustrative and exemplary purposes and is in no way intended to limit the present disclosure or its applications. In other embodiments, the arrangement and/or structural configuration of sensor system 100 can and will vary. For example, the location and positioning of the sensor system 100 can be shifted to the left or right of the illustrated embodiments. In some embodiments, sensor system 100 can comprise fewer or more sensors (e.g., gap distance sensors, gravimetric sensors, or others) as will be discussed in further detail with reference to FIG. 6. Additionally, the location and arrangement of the fulcrum assembly 104 can and will vary in various embodiments. In some embodiments, the fulcrum assembly 104 can be centrally arranged on the mounting structure 108 to permit hinged (FIG. 2) or central coupling of the material engagement member 102, which allows for pivotal or see-saw like rotation of the material engagement member 102. In other embodiments, the fulcrum assembly 104 can be positioned to either the left or right of the mounting structure 108 to also permit hinged coupling of the material engagement member 102. In still other embodiments, the monitoring device 100 can be arranged to exclude the fulcrum assembly 104. In such an arrangement, each of the first and second ends 111, 113 of the material engagement member 102 can be fixedly coupled to the mounting structure 108 such that any force acting on the engagement member 112 by the agricultural material 432 will be transformed from a kinetic energy form to another energy form.

Referring to FIGS. 5A-5C, the rocker arm 110 of the material engagement member 102 is shown in further detail. As illustrated, the rocker arm 110 can comprise a center portion 205 integrally coupled to a first coupling element 206 and a second coupling element 208. The size and dimensions of the first and second coupling elements 206, 208 will vary in various embodiments based on the structural arrangement of the material engagement member 102. For example, in some embodiments, the first and second coupling elements 206, 208 will be sized relative to a length of the engagement member 112 (refer, e.g., to FIGS. 5B and 5C), as well as based on a type of coupling arrangement (i.e., hinged or central coupling) as discussed above.

In embodiments, the rocker arm 110 can comprise a rigid material, such as aluminum, steel, or other suitable metallic materials having sufficient resiliency to resist bending and/or flexing of member 110. Additionally, a stiffening element 203 can be formed in or on at least one surface of the rocker arm 110 and can comprise a plurality of recessed grooves 204 adjacently arranged to further facilitate increased rigidity and stiffening of the rocker arm 110, while also facilitating a reduction in structural weight. Such an arrangement is particularly advantageous in that motion of the material engagement member 102 is restricted to rotational motion on the fulcrum element 130, which substantially decreases its susceptibility to unwanted noise or vibrations. In embodiments, a depth of the plurality of recessed grooves can be the same as the depth of an outer wall of the rocker arm 110.

As shown in FIGS. 3 and 5A, the engagement member 112 can comprise a force plate having a first portion 112a adhesively coupled to a second portion 112b, however, other suitable coupling techniques may be employed. For example, in other embodiments, the first and second portions 112a, 112b can be connected utilizing techniques such as thermal coupling, soldering, lamination, or the like. The first portion 112a can comprise a metallic material, such as aluminum or steel, whereas the second portion 112b, due to its positioning, can comprise a material that is more resistant to abrasive wear (e.g., ceramics) as compared to the first portion 112a. The second portion 112b can comprise an angled surface 115 (e.g., an arced or sloped surface) having a leading edge 117a and a trailing edge 117b that is angled with respect to an outer surface of the mounting structure 108. In some embodiments, the leading edge 117a can be recessed approximately 1 mm from the outer surface of the mounting structure 108 and the trailing edge 117b can be arranged to extend approximately 1 mm from the outer surface of the mounting structure 108. This is done primarily to the minimize wear and to protect the angled surface 115 from having direct impact with a moving mass of agricultural material 432. For example, the angled surface 115 is arranged such that the force exerted by the mass of agricultural material 432 on the angled surface will be concentrated towards a center.

Figure 6:
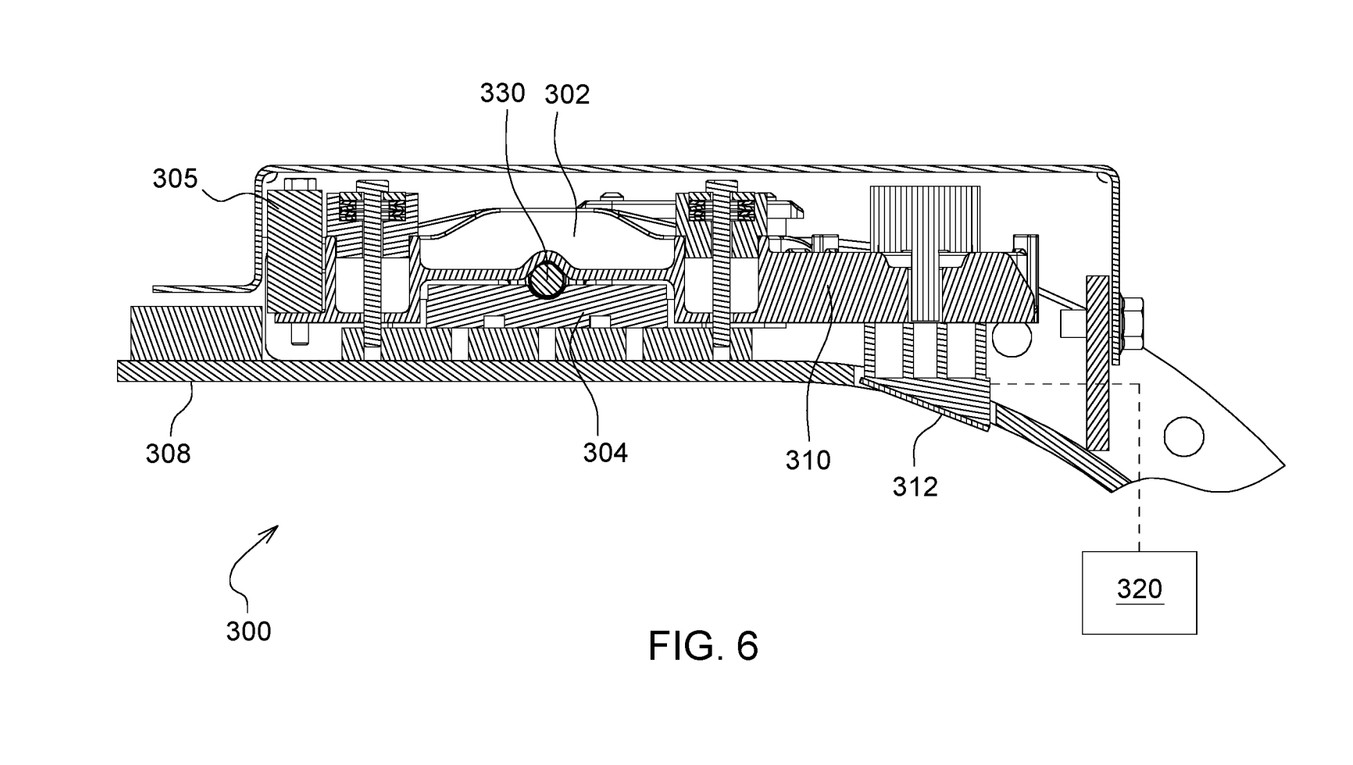
FIG. 6 is a cross-sectional side view of a sensor system according to an embodiment.

As discussed with reference to FIG. 1, and referring now to FIG. 6, in some embodiments, the sensor system 100 can further comprise an adjustment mechanism 320 coupled to the engagement member 112. The adjustment mechanism 320 can comprise an actuation device such as a drive motor coupled to a threaded screw shaft (not shown) and arranged to two-dimensionally adjust a position of the engagement member 112. The driver motor can be communicatively coupled to the processing device 118 such that upon receipt of a control signal a null position (i.e., default position without impact) of the material engagement member 102 is rotationally or translationally adjusted. Such an arrangement is particularly advantageous in that it helps to improve the measurement accuracy and performance of the sensor system 106 for a variety of crops, sensor pitches or rolls of the sensor system 100 relative to gravity; or for various measurement ranges of the sensor system 100 for a given agricultural material. For example, a characteristic response of the engagement member 112 can be modified by dynamically adjusting the position of the engagement member 112 based on a mass flow rate of the agricultural material 432.

In other embodiments, the adjustment mechanism 320 can comprise an adjustable damping mechanism or dashpot (not shown) that operates to change a range of applied force that results in the material engagement member 102 moving the full range of rotational magnitude. For example, a first dashpot setting can be used with low mass flow rate crops such as small grains, whereas a second dashpot setting can be used with high mass flow rate crops such as corn. Other examples include having a range of settings for various crops for the mechanism. In still other embodiments, rather than performing a null position adjustment, the sensor system 100 can comprise a gravimetric sensor (not shown) that is configured to detect the position of the material engagement member 102 relative to the earth's gravity. In such an arrangement, the relative gravimetric data is transmitted from the gravimetric sensor to the processing device 118 for dynamic scaling or initial calibration of the data.

Referring to FIGS. 7-8, an exemplary embodiment of the agricultural work machine 400 (e.g., a harvester) in which the sensor system 100 of FIG. 1 is arranged is shown. As depicted, the agricultural work machine 400 can comprise a vehicle frame 402 having ground engaging elements 404 extending from the vehicle frame 402. To control operations of the agricultural work machine 400, an operator's cab 410 can be arranged atop of the vehicle frame 402.

A harvesting apparatus 412 is arranged to extend forward of the agricultural work machine 400 and can comprise a harvesting platform 414, a feeder house 416, and a beater 418. The harvesting platform 414 can be arranged at a lower end of the harvesting apparatus 412 and is used for harvesting the agricultural material 432. The feeder house 416 can be interposedly arranged between the harvesting platform 414 and the beater 418 to direct the agricultural material 432 received by the of the harvesting apparatus 412 upwardly through an inlet transition section 420 to a crop processing unit 422.

A material separation system 426, which removes chaff from the agricultural material 432, can be arranged beneath the crop processing unit 422 and coupled to a lower end of the crop conveyor assembly 424 as shown in FIG. 3. The crop conveyer assembly can comprise a plurality of movable members 430 attached to a rotating mechanism 434 (e.g., belt or chain and cog or pulley), which extend outwardly and away from a center axis 137 of the rotating mechanism 434. As will be appreciated by one skilled in the art, FIG. 3 is not drawn to scale and the illustrated embodiment is merely for exemplary purposes to facilitate explanation of the material separation system 426. For example, although not shown, in various embodiments, each of the movable members 430 can and will comprise a generally curved or arcuate shaped configuration.

As depicted, the plurality of movable members 430 of the crop conveyor assembly 424 receives the separated material and directs the agricultural material 432 to a transition area 427 where the agricultural material 432 engages with the material engagement member 102 and is supplied to a loading auger 434 for loading into a material tank 450. In some embodiments, the agricultural vehicle can further comprise a location determining receiver 436 arranged on the operator's cab 410 for receiving location/positioning signals.

Figure 9:
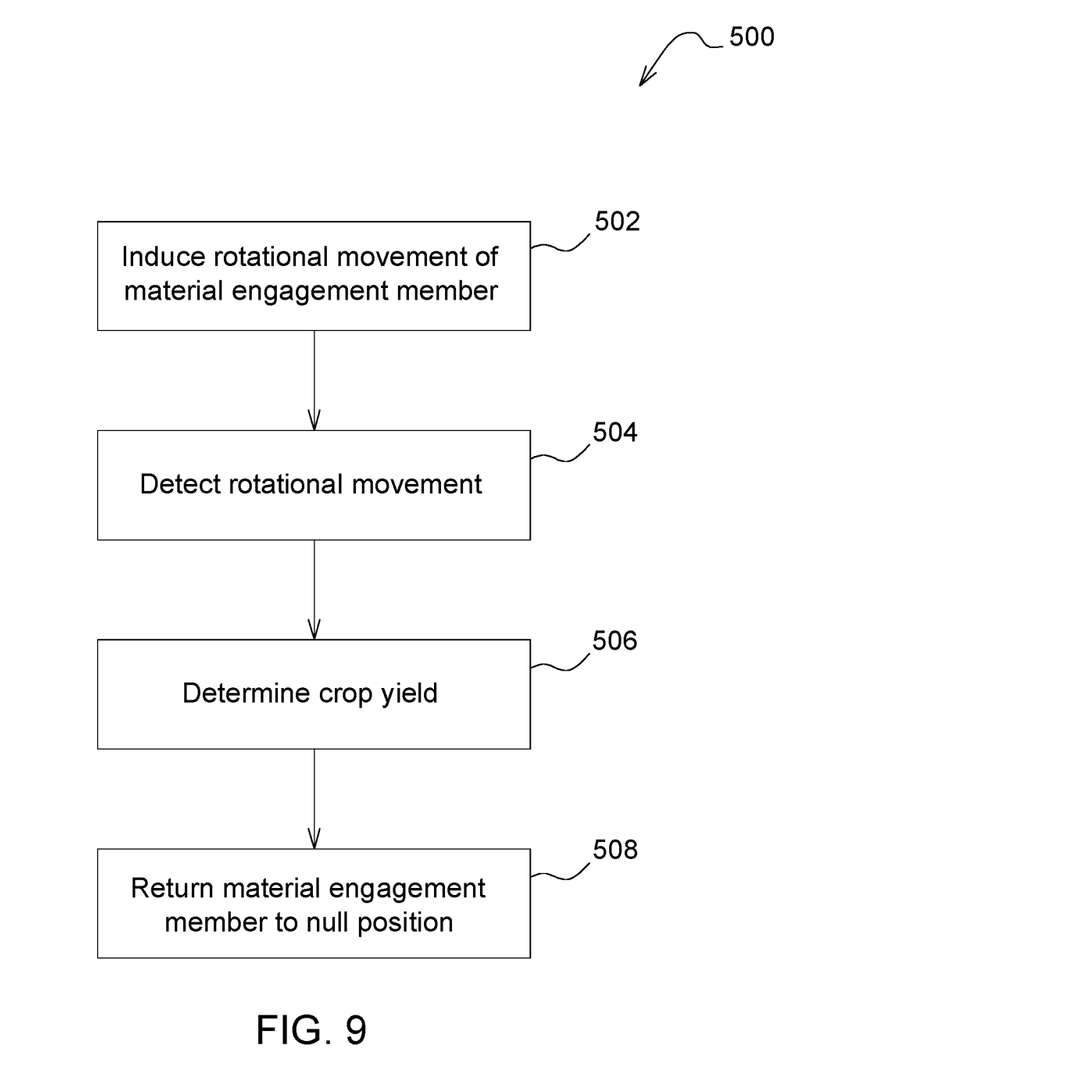
FIG. 9 is a flow diagram of a method for determining a crop yield utilizing the sensor system of FIG. 1.

Referring to FIG. 9, a flow diagram of a method 500 for determining crop yield is shown. In operation, as the agricultural material 432 is transferred from the material separation system 426 to the movable members 430, the agricultural material 432 is conveyed clockwise and upward by the crop conveyor assembly 424 to the material engagement member 102. For example, once the agricultural material 432 reaches an upper end of the crop conveyor assembly 424, the agricultural material 432 is thrown from the movable members 430 to the material engagement member 102.

As illustrated in FIG. 8, at 502, an angular force (e.g., centripetal force) is exerted upon the angled surface 115 of the second engagement member 112 as the agricultural material 432 impacts the surface, thereby inducing rotational or pivotal movement of each edge 117a, 117b of the angled surface 115 relative to one another. Rotational and pivotal movement of the first end 111 and/or the second end 113 is also induced as a result of the impact. As previously discussed, such rotational movement will be determined, in part, based on the coupling arrangement (e.g., hinged or central coupling) of the material engagement member 102. For example, upon engagement in a hinged coupling arrangement, either the first end 111 or second end 113 will be disproportionally displaced (i.e., the two ends do not move equal distances relative to one another) relative to one another about the fulcrum element 112 (i.e., the two ends do not move equal distances relative to one another such that the rotational magnitude of displacement of each is disproportionate to the other). In a central coupling arrangement, however, both ends 111, 113 will be disproportionally displaced in a seesaw-like manner relative to one another.

At 504, the at least one gap distance sensor is configured to measure a rotational magnitude of the displacement of the material engagement member 102. The rotational magnitude of the displacement will vary based on a level of impact. For example, a maximum rotational magnitude will result when the material engagement member 102 is upwardly displaced (e.g., high grain impact), and a minimum rotational magnitude will result when the material engagement member 102 is in a downward position (trailing edge 117b extends beyond mounting structure 108) or at rest. In one embodiment, the at least one gap distance sensor 106 can comprise potentiometers, rotary encoders, integrated magneto-resistive sensors, Hall encoders, combinations thereof, or other suitable sensors that are configured to detect an angular change of the material engagement member 102 relative to the fulcrum assembly 104. It should be noted, however, that the type of sensor employed will vary based on a desired measurement output.

For example, in other embodiments, the at least one gap distance sensor 106 can be configured to detect a change in a position of the material engagement member 102 relative to the sensor 106 in either a differential or non-differential sensing mode. As referred to herein, the "non-differential sensing mode" includes a mode in which one or more sensors output measurement signals that are individually processed. In contrast, the "differential sensing mode" includes a mode in which two or more sensors simultaneously output measurement signals which are subtracted to yield a measurement free of common-mode error. For example, in a differential sensing mode, the first and second sensors 106a, 106b are configured to detect a change in a distance (i.e., spatial gap) or inclination of the rocker arm 110 relative to the fulcrum assembly 104. Use of the two or more sensors in the differential sensing mode can help to mitigate error, for example, without limitation, from common mode vibration of the material engagement member 102, or temperature drift of the sensors.

In either sensing mode, the at least one gap distance sensor 106 can comprise one or more of the following sensors: linear potentiometers, magnetic proximity sensors, optical distance sensors, ultrasonic sensors, Hall effect sensors, inductive sensors, giant magneto-resistive sensors, or the like. At 506, based upon the measured rotational magnitude, the processing device 118 can determine a crop yield and generate an output of an aggregate crop yield for display on a user interface arranged in the operator's cab 410.

Next at 508, the elastic member 116 operates to apply a restorative force to the material engagement member 102 to return member 102 to a null position once the material engagement is displaced. For example, such displacement will result in a relatively small restoring force and as the displacement becomes greater the restoring force proportionally increases. In some embodiments, a spring constant of the elastic member 116 providing restorative force may be varied through means such as spring temperature, a torsional spring arranged on the fulcrum assembly 104 with an integrated electro-rheological or magneto-rheological fluid. The variable resistive force may be achieved with technologies such as variable pressure pneumatic dashpots, electro-rheological dashpots, magneto-rheological dashpots, or other suitable devices.

Without in any way limiting the scope, interpretation, or application of the claims appearing below, a technical effect of one or more of the example embodiments disclosed herein is a sensor system for determining crop yield. Notably, the present disclosure has several advantages over conventional approaches, including, but not limited to, providing increased sensor resolution, providing scalabity for a variety of crop types, effective cancellation of unwanted noise and vibrations.

While the above describes example embodiments of the present disclosure, these descriptions should not be viewed in a limiting sense. Rather, other variations and modifications may be made without departing from the scope and spirit of the present disclosure as defined in the appended claims.

What is claimed is:

1. A sensor system for determining crop yield, the sensor system comprising:
a mounting structure mounted to a housing of a grain elevator of an agricultural work machine proximate a crop conveyor assembly arranged in the housing, the mounting structure comprising at least one aperture formed therein;
a fulcrum assembly arranged on the mounting structure and comprising a fulcrum element coupled to a base member;
a rocker arm pivotal about a pivot axis of the fulcrum assembly and arranged to extend between a first end and a second end;
an engagement member coupled to the second end of the rocker arm and arranged to extend through the at least one aperture of the mounting structure;
at least one gap distance sensor mounted to the base member of the fulcrum assembly and configured to detect an inclination of the rocker arm relative to the fulcrum assembly; and
a processing device coupled to the gap distance sensor, wherein the processing device is configured to correlate the detected inclination of the rocker arm to an applied force acting on the engagement member when a movable grain mass engages with the engagement member, and wherein the processing device is configured to determine an aggregate crop yield based on the applied force.

2. The sensor system of claim 1 further comprising a counter weight arranged at the first end of the rocker arm for balancing the rocker arm in a first position and a second position.

3. The sensor system of claim 2, wherein the first position corresponds to a position of the rocker arm at rest, and wherein the second position corresponds to an inclined position of the rocker arm.

4. The sensor system of claim 1, wherein the at least one gap distance sensor comprises a first sensor and a second sensor arranged on opposing sides of the fulcrum element, wherein the first sensor is configured to generate a first output signal and the second sensor is configured to generate a second output signal.

5. The sensor system of claim 4, wherein the processing device is configured to compute a differential output signal based on a difference between respective the first output signal and the second output signal when the rocker arm is arranged in a first position to cancel out noise induced mechanical vibrations of the rocker arm.

6. The sensor system of claim 1, wherein the first sensor and second sensor comprises one or more of the following: inductive sensors, capacitive sensors, piezoelectric sensors, photoelectric sensors, ultrasonic sensors, magnetic field sensors, or combinations thereof.

7. The sensor system of claim 1, wherein the rocker arm comprises a stiffening member formed on at least one surface of the rocker arm, the stiffening member comprising a plurality of recessed grooves adjacently arranged to facilitate increased stiffening of the rocker arm.

8. The sensor system of claim 7, wherein a depth of the plurality of recessed grooves is the same as the depth of an outer wall of the rocker arm.

9. The sensor system of claim 1, wherein the rocker arm is spring loaded.

10. The sensor system of claim 1, wherein an upper end of the engagement member is engaged in flushed relation with a bottom surface of the second end of the rocker arm and a lower end is angled with respect to the an outer surface of the mounting structure.

11. The sensor system of claim 1, wherein the engagement member is coupled to the rocker arm by at least three fastener elements.

12. The sensor system of claim 7, wherein the engagement member is sized and shaped for movable insertion into the at least one aperture of the mounting structure.

13. The sensor system of claim 7, wherein a first portion of the engagement member is coupled to a second portion of the engagement member, and wherein the first portion comprises a metallic material and the second portion comprises a material more resistant to abrasive wear compared to the first portion.

14. The sensor system of claim 8, wherein a leading edge of the lower end of the engagement member is recessed approximately 1 mm from the outer surface of the mounting structure, and wherein a trailing edge of the engagement member extends approximately 1 mm from the outer surface of the mounting structure.

15. A method for determining crop yield, the method comprising:

detecting, with at least one gap distance sensor, an inclination of a rocker arm coupled to a mounting structure arranged within a housing of a grain elevator of an agricultural work machine;

correlating a degree of inclination of the rocker arm to an applied force acting on the engagement member, wherein the applied force is related to a flow rate of a mass of agricultural material engaged with the engagement member; and determining a crop yield based on the applied force.

16. The method of claim 15, wherein detecting an inclination of a rocker arm further comprises determining a maximum or minimum rotational magnitude of the inclination in a differential sensing mode.

17. The method of claim 16, wherein the differential sensing mode comprises utilizing two or more gap distance sensors that simultaneously output measurement signals which are subtracted to yield a measurement free of common-mode error.

18. The method of claim 15, wherein the at least one gap distance sensor comprises a first sensor and a second sensor arranged on opposing sides of the fulcrum element, wherein the first sensor is configured to generate a first output signal and the second sensor is configured to generate a second output signal.

19. The method of claim 15, wherein the engagement member comprises an angled surface such that the mass of agricultural material engages the angled surface at an angle normal to the angled surface.

20. The method of claim 15, wherein applied force is a centripetal force.

* * * * *